United States Patent
Lawrence et al.

(10) Patent No.: US 10,440,970 B2
(45) Date of Patent: Oct. 15, 2019

(54) GRAIN MANAGEMENT BASED ON NUTRIENT CHARACTERISTICS

(71) Applicant: IntelliFarms, LLC, Archie, MO (US)

(72) Inventors: Johnselvakumar Lawrence, Harrisonville, MO (US); Charles Todd Sears, Archie, MO (US)

(73) Assignee: IntelliFarms, LLC, Archie, MO (US)

( * ) Notice: Subject to any disclaimer, the term of this patent is extended or adjusted under 35 U.S.C. 154(b) by 476 days.

(21) Appl. No.: 14/973,669

(22) Filed: Dec. 17, 2015

(65) Prior Publication Data

US 2016/0183548 A1 Jun. 30, 2016

Related U.S. Application Data

(60) Provisional application No. 62/097,346, filed on Dec. 29, 2014.

(51) Int. Cl.
*A23B 9/00* (2006.01)

(52) U.S. Cl.
CPC ............ *A23B 9/00* (2013.01); *A23V 2002/00* (2013.01)

(58) Field of Classification Search
CPC ....................................................... A23B 9/00
See application file for complete search history.

(56) References Cited

U.S. PATENT DOCUMENTS

| 4,903,414 A * | 2/1990 | White ................ A23B 9/025 |
| | | 34/210 |
| 6,530,160 B1 * | 3/2003 | Gookins ............... F26B 9/063 |
| | | 34/418 |
| 8,806,772 B1 | 8/2014 | Schaefer, Jr. |
| 2013/0015251 A1 * | 1/2013 | Bloemendaal .......... A01F 25/22 |
| | | 236/49.3 |
| 2015/0026995 A1 | 1/2015 | Schaefer, Jr. |

OTHER PUBLICATIONS

America Society of Agricultural and Biological Engineers, "ASABE Standard: Moisture Plant-based Agricultural Products," ASAE D245.5 Oct. 1995 (R2001), pp. 551-568.
Brooker, et al., "Drying and Storage of Grains and Oilseeds," 1992 AVI, New York, Chapter 3, Air Drying Properties, pp. 27-65 (esp p. 62).
Chen, C., et al, "Equilibrium relative humidity (ERH) relationships for yellow-dent corn" Trans. ASAE, May/Jun. 1989, vol. 32, 999-1006.

(Continued)

*Primary Examiner* — Manuel L Barbee
(74) *Attorney, Agent, or Firm* — Nathan S. Smith; Kenneth C. Cheney; Morgan, Lewis & Bockius LLP

(57) ABSTRACT

A grain management system can condition a grain mass held in grain storage equipment using environmental inputs, varietal inputs, nutrient inputs, and/or characteristic inputs. The inputs can provide a customized grain conditioning strategy or program to maintain nutritional attributes of the grain mass and/or prevent overdrying, mold, decomposition, or other spoilage of the grain mass. The inputs can be entered by a user or automatically detected or entered based on present or historical data associated with the grain or grain conditioning equipment.

17 Claims, 8 Drawing Sheets

(56) References Cited

OTHER PUBLICATIONS

Egli, D,B., et al., "The Effects of Changes in Seed Protein Concentration on Seed Growth Characteristics of Soybean," University of Kentucky College of Agriculture, Department of Agronomy, Dec. 2013, retrieved from <http://www2.ca.uky.edu/agc/pubs/pr/pr483/specialty.HTM>.

Friday, D., et al., "Effects of Hybrid and Damage on Mold Development During Low-Temperature Drying and Storage of High Moisture Shelled Corn," Drying Technology, 1990, vol. 8, No. 3, pp. 499-531.

Garg, D., et al., "Equilibrium Moisture Content (EMC) Relationships of Three Popcorn Grain Varieties and their Incorporation into In-Bin Grain Conditioning Strategies," 9th International Working Conference on Stored Product Protection, 2006, pp. 994-1002.

Gonzales, H.B. et al., "Simultaneous Monitoring of Stored Grain with Relative Humidity, Temperature, and Carbon Dioxide Sensors," Applied Engineering in Agriculture, American Society of Agricultural and Biological Engineers, 2009, vol. 25, No. 4, pp. 595-604.

Harrington, J.F., "Seed Storage and Longevity" Seed Biology 1972, Academic Press. Chapter 3, pp. 145-245.

Kirk, J.R., "Biological Availability of Nutrients in Processed Foods," Journal of Chemical 1984, vol. 61, pp. 364-367.

Kong F, et al., "Changes in Protein Characteristics During Soybean Storage Under Adverse Conditions as Related to Tofu Making," J Agric Food Chem., 2013, vol. 61, No. 2, 387-393.

Kong, F, et al., "Changes of Soybean Quality During Storage as Related to Soymilk and Tofu Making," J Food Sci. 2008, vol. 73, No. 3, pp. S134-S144.

Marks, B.P. et al., "Effects of Previous Storage History, Hybrid, and Drying Method on the Storability of Maize Grain (Corn)," J. Stored Prod. Res., 1995, vol. 31, No. 4, pp. 343-354.

Molteberg, E.L., et al., "Effects of Storage and Heat Processing on the Composition of Free Fatty Acids in Oats," Cereal Chemistry, 1995, vol. 72, No. 1, pp. 88-93.

Rehman, Z., et al., "Biochemical Changes in Wheat During Storage at Three Temperatures," Plant Foods for Human Nutrition, 1999, vol. 54, No. 2, pp. 109-117.

Rupollo, G., et al., "Hermetic and Conventional Storage Systems in Oat Grains Conservation," Ciência Rural, Nov.-Dec. 2004, vol. 34, No. 6, pp. 1715-1722.

Saio, K., et al., "Protein Denaturation During Model Storage Studies of Soybeans and Meals," Cereal Chemistry, 1982, vol. 59, No. 5, pp. 408-412.

Sinclair, et al., "Photosynthate and Nitrogen Requirements for Seed Production by Various Crops," Science, Aug. 1975, vol. 189, No. 4202, pp. 565-567.

Triboi, E., et al., "Productivity and Grain or Seed Composition: A New Approach to an Old Problem—Invited Paper," European Journal of Agronomy, 2002, vol. 16, pp. 163-186.

Uddin, M.S. et al., "Accuracy of Grain Moisture Content Prediction Using Temperature and Relative Humidity Sensors," Applied Engineering in Agriculture, American Society of Agricultural and Biological Engineers, 2006, vol. 22, No. 2, pp. 267-273.

Zhou, Z., et al., "Ageing of Stored Rice: Changes in Chemical and Physical Attributes" Journal of Cereal Science, 2002, vol. 35, pp. 65-78.

\* cited by examiner

GRAIN MANAGEMENT BASED ON NUTRIENT CHARACTERISTICS

CROSS-REFERENCE TO RELATED APPLICATION(S)

This application is based upon and claims priority to U.S. provisional patent application 62/097,346, entitled "GRAIN MANAGEMENT SYSTEM," filed Dec. 29, 2014, the entire contents of which are incorporated by reference herein.

FIELD

The disclosure relates in general to grain bin management systems, and in particular to, for example, without limitation, grain conditioning systems that can be customized to maintain desired nutrient characteristics of the grain.

BACKGROUND

Equilibrium moisture content ("EMC") is a characteristic of food grain. When grain achieves an EMC, the grain is neither gaining nor losing moisture. The EMC concept can be used in grain storage techniques for in-bin natural air drying and storing of grains, oil seeds, and specialty crops (collectively referred to herein as grain or grain mass).

After grain is harvested, the grain will dry until the grain reaches its EMC, based on the relative humidity ("RH") and temperature of the environment surrounding the grain. The moisture content of the grain must be carefully controlled to ensure that the grain does not become over-dried, thus reducing the weight of the grain and commercial value thereof. The moisture content of the grain must also be limited to prevent germination of the grain, infestation by insects and microorganisms, or other decomposition of the grain. For example, a RH of less than 65% will retard mold growth and is considered an acceptable limit for safe storage moisture content. Indeed, grain storage or conditioning is a critical task in ensuring that grain achieves its highest commercial value.

The description provided in the background section, including without limitation, any problems, features, solutions or information, should not be assumed to be prior art merely because it is mentioned in or associated with the background section. The background section may include information that describes one or more aspects of the subject technology.

SUMMARY

The description in this summary section may provide some illustrative examples of the disclosure. This section is not intended to be a broad overview or to identify essential elements of the disclosure.

An aspect of at least some embodiments disclosed herein is the realization that storage conditions for grain, such as air condition selection for drying or rewetting, can be selected in response to various inputs, such as the EMC of the grain and/or other factors. For example, a grain conditioning strategy or program can be based on the grain variety or hybrid, one or more desired grain nutrient characteristics, growing characteristics, environmental characteristics, and/or conditioning characteristics.

Another aspect of at least some embodiments disclosed herein is the realization that an EMC relationship or curve can vary among hybrids of the same variety of grain. Applicant has found that a change in seed composition in certain hybrids can also change the EMC characteristics of that seed. As used herein, an EMC relationship or curve can be defined as the EMC of grain at a given RH and ambient temperature. For example, there may be a difference of up to 2% moisture between two different hybrids of corn (e.g., Pioneer P9690R and Sygenta 785) at the same RH and ambient temperature. Thus, in some embodiments, although a grain conditioning operation can be based on the variety of a grain, the grain conditioning operation can be based on the grain hybrid. Further, some embodiments can be implemented in which a grain conditioning operation is based on one or more growing, environmental, or conditioning characteristics and/or one or more desired grain nutrient characteristics.

In accordance with some implementations of the present disclosure, Applicant has developed over 150 EMC curves for different hybrids with different brand name and different trait resistance information. As discussed further herein, these EMC curves can be used in combination with one or more growing, environmental, or conditioning characteristics and/or one or more desired grain nutrient characteristics to generate instructions for implementing a grain conditioning strategy or program specific to a grain mass.

For example, some embodiments provide a system for conditioning a grain mass that can comprise a memory, having instructions, and a processor that can be configured to receive one or more inputs and generate instructions for controlling a conditioning operation for the grain mass. The inputs can comprise environmental data, a varietal input representative of a grain variety, a nutrient input representative of a food nutrient characteristic, and/or a characteristic input representative of a growing, environmental, or conditioning characteristic of the grain and/or grain conditioning equipment. Other historical data of the grain mass or grain conditioning equipment can also be utilized in developing or executing the conditioning strategy or program.

DETAILED DESCRIPTION

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In accordance with some embodiments, a system can be provided that conditions a grain mass held in grain storage equipment using environmental inputs, varietal inputs, nutrient inputs, and/or characteristic inputs. The inputs can provide a customized grain conditioning strategy or program to maintain nutritional attributes of the grain mass and/or prevent overdrying, mold, decomposition, or other spoilage of the grain mass. The inputs can be entered by a user or automatically detected or entered based on present or historical data associated with the grain or grain conditioning equipment. The system can be a "smart" system that utilizes various inputs and historical data observed during the operation of the grain conditioning equipment or during conditioning of the given grain type. The system can thus utilize past results in developing conditioning strategies. Further, the system can utilize and incorporate real-time results or data from other grain conditioning systems, operating in parallel, in order to achieve superior conditioning of the grain.

Figure 1:
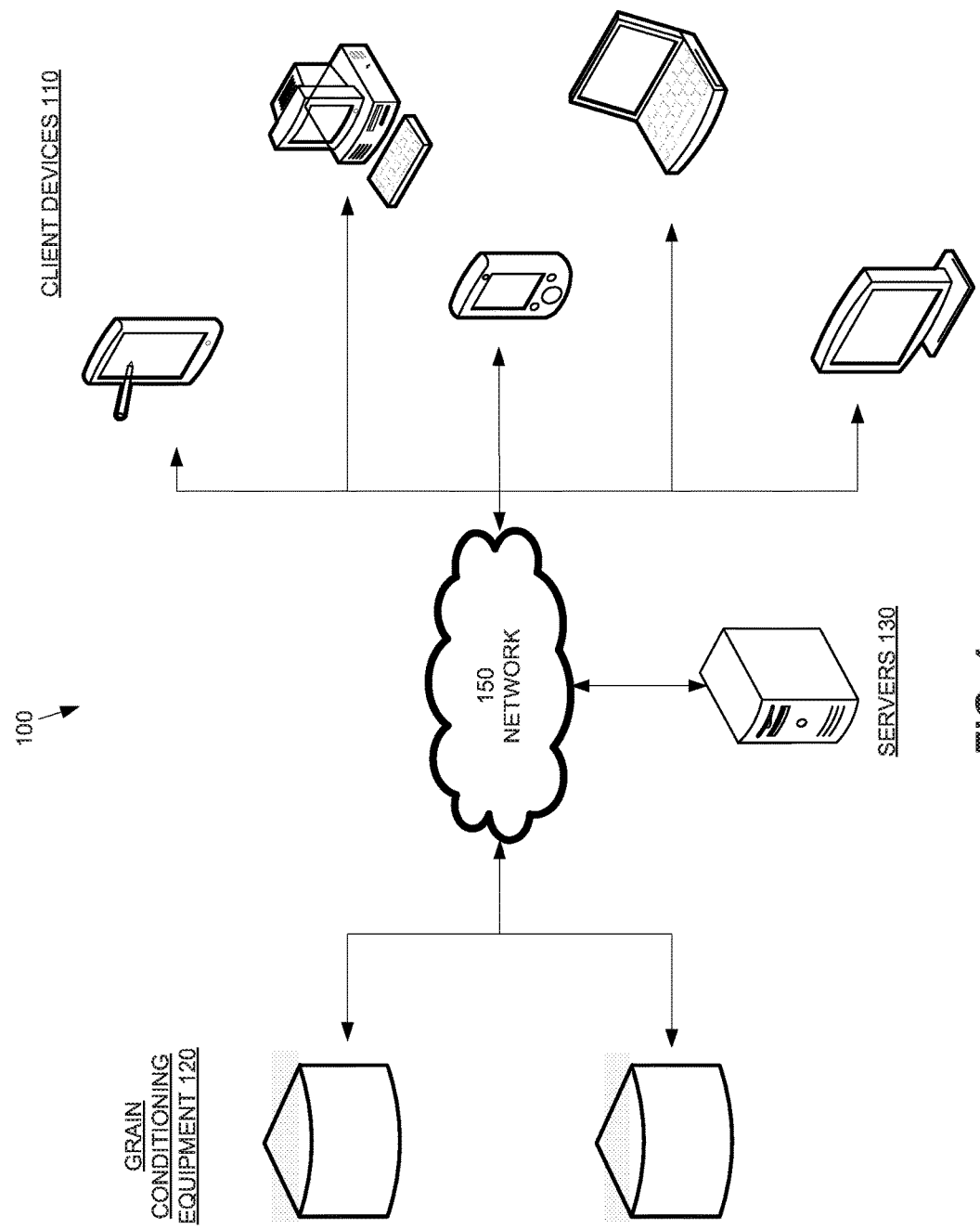
FIG. 1 illustrates an example architecture for a grain management system, according to some embodiments.

FIG. 1 illustrates an example architecture 100 for a grain conditioning or grain management system. The architecture 100 includes one or more grain conditioning equipment 120, one or more servers 130, and one or more client devices 110 connected over a network 150.

One or more servers 130 can be configured to receive inputs and generate instructions for operating grain conditioning equipment. The servers 130 can store received inputs and/or operational parameters of the grain conditioning equipment ("grain information"). This store data can be accessed and used to facilitate determination and/or as a basis for generating instructions for operating the grain conditioning equipment.

The servers 130 can be any device having an appropriate processor, memory, and communications capability for a grain bin management system. The client devices 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The grain conditioning equipment 120 may be any device, such as fans, heaters, dryers, etc., capable of performing grain conditioning operations. The grain conditioning equipment 120 may be internal or external to a grain bin or other grain storage equipment. The server 130 may communicate to the grain conditioning equipment 120 through the network 150, as shown in FIG. 1, or through another communication channel.

Figure 2:
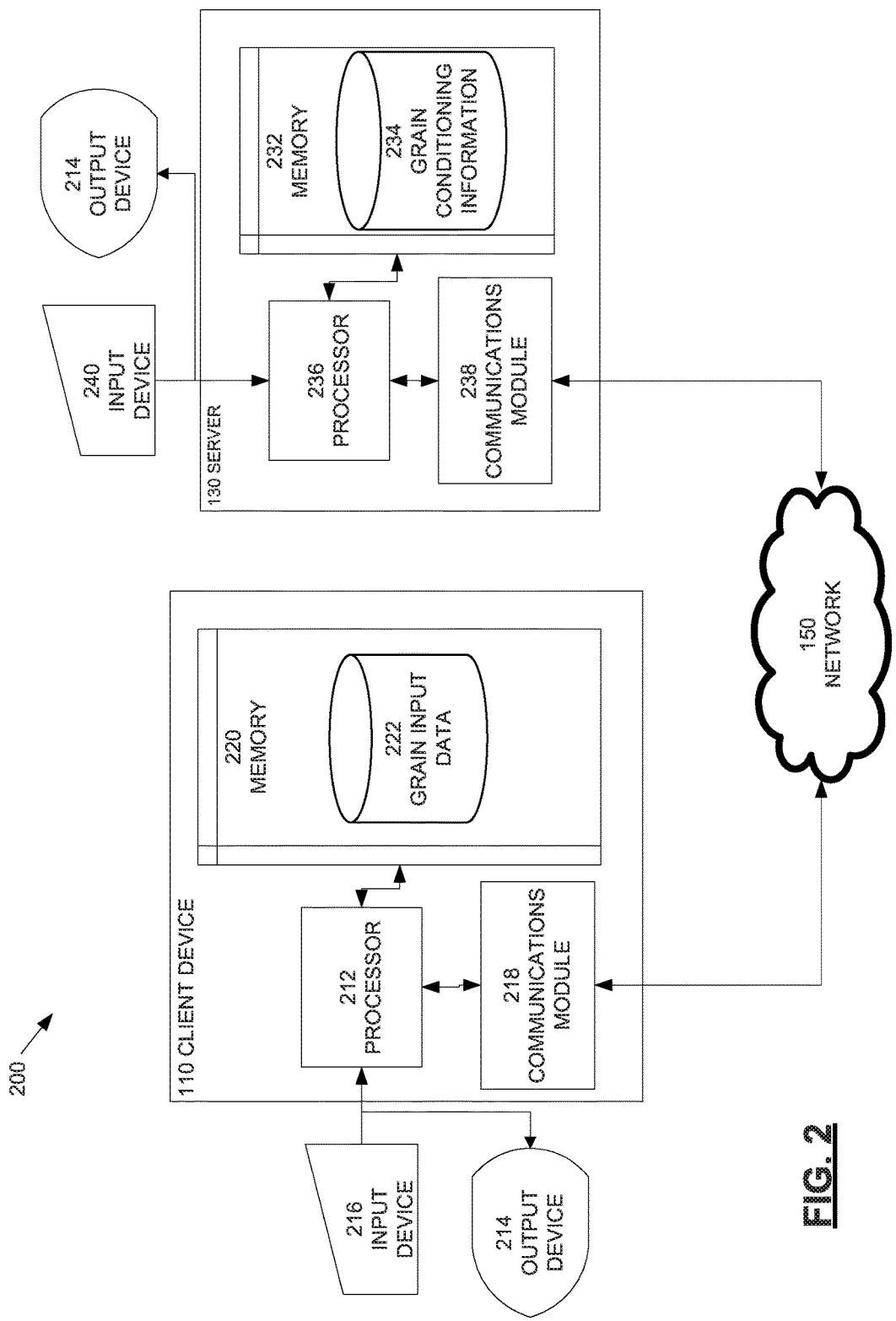
FIG. 2 is a block diagram illustrating the example client and server from the architecture of FIG. 1, according to some embodiments.

FIG. 2 is a block diagram 200 illustrating an example server 130 and client device 110 in the architecture 100 of FIG. 1 according to certain aspects of the disclosure. The client device 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 can include a processor 236, the communications module 238, and a memory 232 that includes grain conditioning information 234. The grain conditioning information 234 can comprise EMC data or curves for various grain hybrids, historical data for a given grain mass or grain conditioning equipment, as well as various mathematical relationships associated with grain, grain conditioning equipment, and/or environmental attributes. The processor 236 of the server 130 is configured to execute instructions, such as instructions physically coded into the processor 236, instructions received from software in memory 232, or a combination of both. For example, the processor 236 of the server 130 can execute instructions to receive a request from the client device 110, a non-authenticated device, to view content. The request can be sent by the communications module 218 of the client device 110 over the network 150 to the communications module 238 of the server 130 for processing by the server processor 236.

The memory 220 of the client device 110 can include grain input data 222. The grain input data can be accessed and selected to be sent over the network 150 as an input to the server 130. The processor 212 can be instructed to provide, for display (e.g., on output device 214), one or more selections that can be made by the user using the input device 216, for example, based on any of the grain input data 222.

Based on the input to the server 130 over the network 150 from the communications module 218, the server 130 can generate instructions for an output device 214, such as any of a variety of grain conditioning devices or equipment or the grain conditioning equipment 120. Alternatively, the server 130 may communicate instructions to the grain conditioning equipment 120 through the network 150. The processor 236 can generate and/or execute instructions to control or direct control of grain conditioning devices or equipment in response to the input from the client 110 and/or an input from the input device 240. Input device 240 can comprise a monitoring device such as a condition sensor assembly configured to detect temperature, RH, air pressure, mass or size, or other attributes of the grain or grain bin. Such devices can include those disclosed in U.S. Pat. No. 8,806,772, the entirety of which is incorporated herein by reference.

Figure 3:
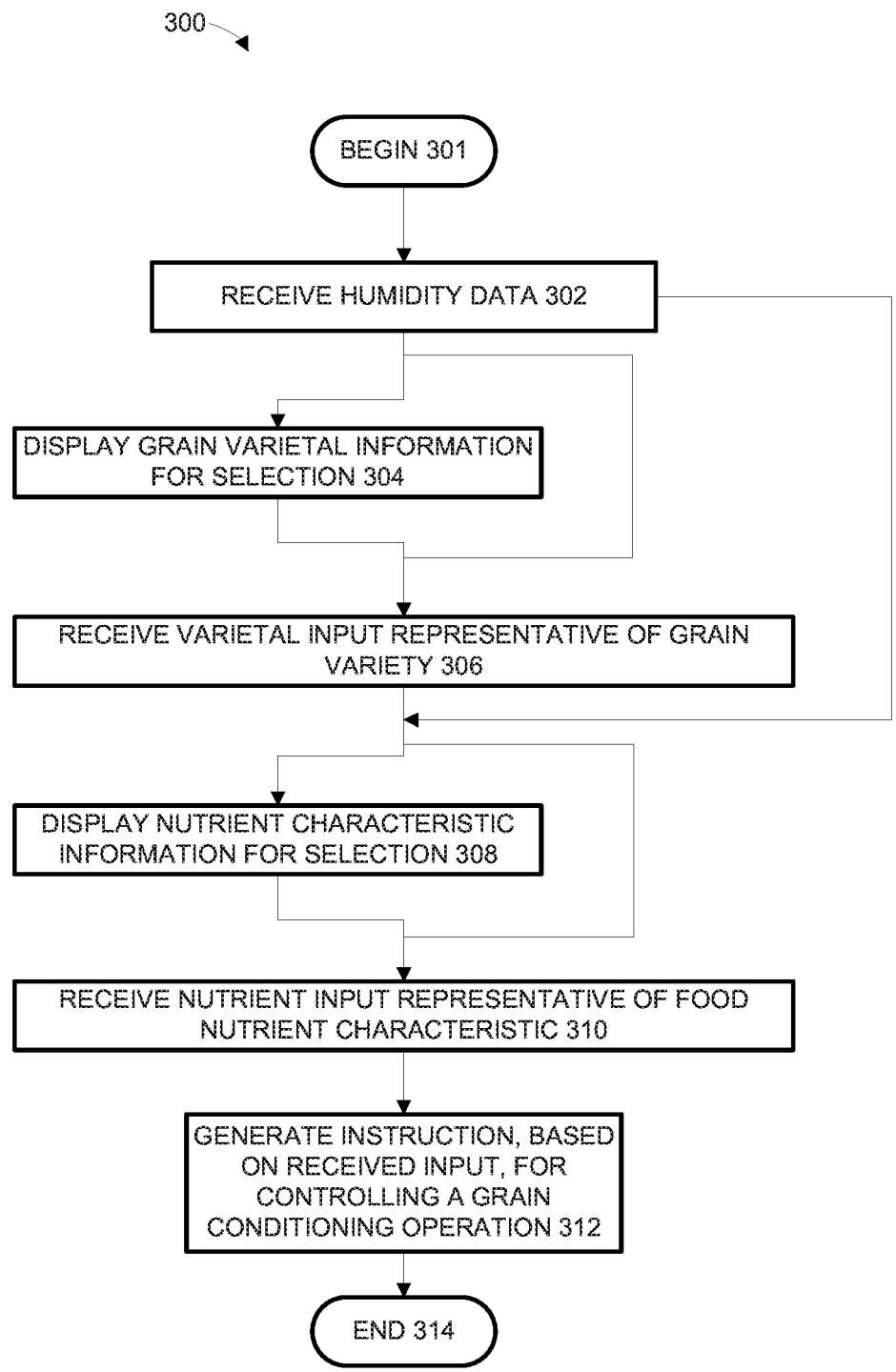
FIGS. 3-4 illustrate example processes for conditioning grain, using an example client and server of FIG. 2, according to some embodiments.
Figure 4:
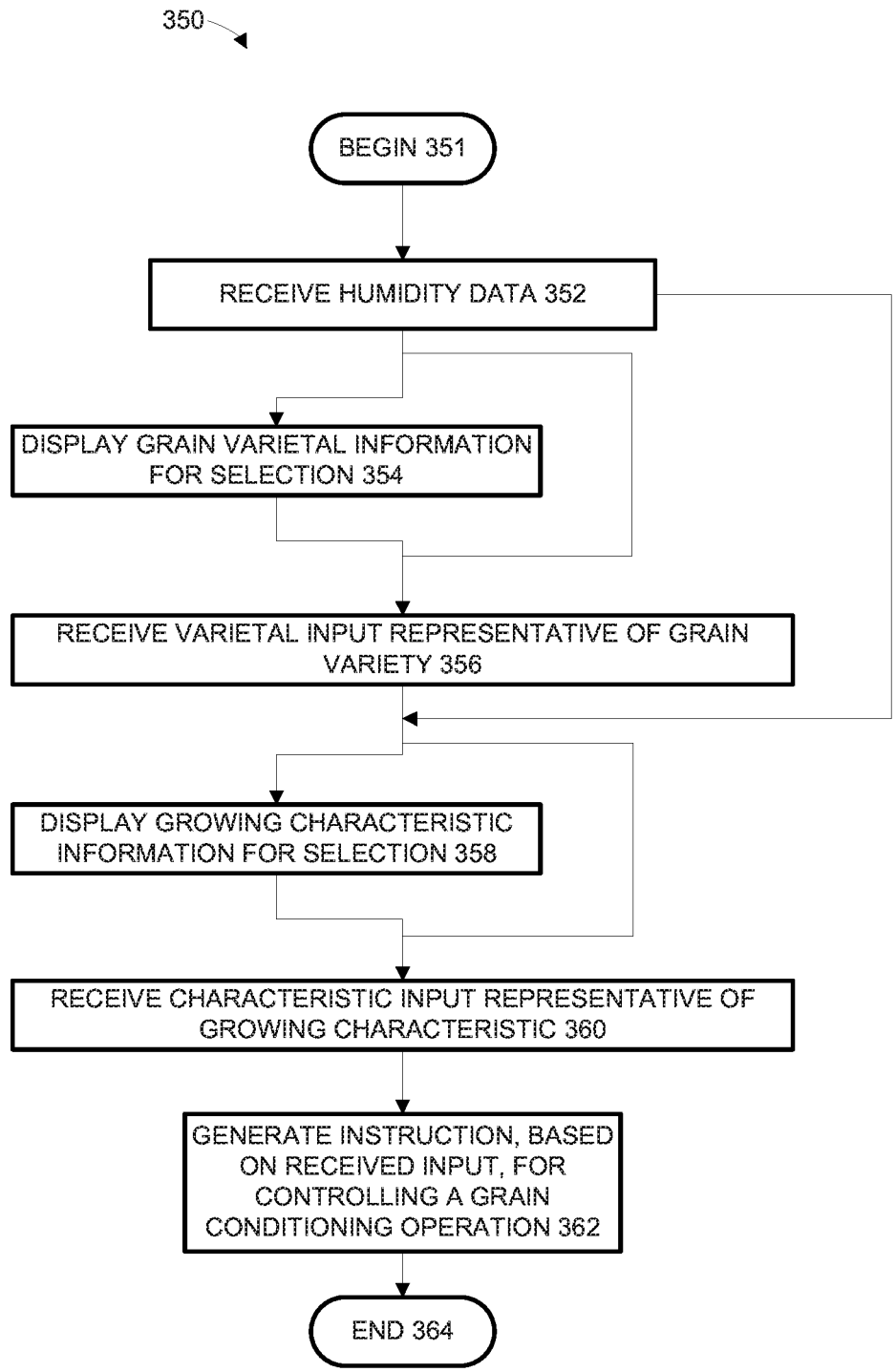

FIGS. 3 and 4 illustrate example processes 300, 350 for managing a grain bin or other grain storage equipment. In both of the processes 300, 350, the grain storage equipment holds grain and includes one or more feedback mechanisms that monitor temperature, RH, and/or other attributes of the grain or grain equipment characteristics. The processes 300, 350 can enable a user to dry recently harvested grain in a manner that retains desired grain characteristics, quality, and moisture content. The user can thereby minimize infestation and germination while maximizing consumer acceptability of appearance and other organoleptic properties.

Referring to FIG. 3, the process 300 begins in step 301 when a user loads the browser on the client 110 for viewing and/or controlling an operation of the grain management system. As shown in step 302, the process 300 can include receiving one or more types of data inputs, such as RH, temperature, air pressure, weight, or other environmental parameters, status of the grain bin, or a characteristic of grain in the grain bin. This data can be provided automatically or in response to a request or signal controlled or sent by the user. The data can be obtained through a variety of different monitoring devices that can be used with grain storage equipment, inside or outside the grain bin, as discussed herein. For example, the monitoring devices can comprise condition sensor assemblies configured to detect environmental conditions inside or outside a grain bin, such as temperature, RH, absolute humidity, air velocity, or air pressure, and/or attributes of the grain or grain bin, such as grain mass, temperature, weight, size, or other such attributes. Such sensing devices can include those disclosed in U.S. Pat. No. 8,806,772, the entirety of which is incorporated herein by reference.

Optionally, in step 304, the process 300 can comprise displaying grain varietal information for selection by the user. The user can input information, such as a varietal input, that is representative of a grain variety in step 306. The varietal input can comprise one or more traits or characteristics of the grain itself. For example, the varietal input can comprise a number that is entered by the user into the system. The number entered by the user can correspond to a given grain or seed type, as is used in the industry. The varietal input can identify certain traits of the grain, such as general traits (such as drought resistant or dry down characteristics), plant and seed traits (such as G2 genetics-accelerated yield technology), management traits (such as herbicide tolerant), and/or general health traits (such as disease resistance, including, for example, polypethora tolerance, brown root, stem rot, white mold, fungi leaf spot, nematode resistant, rust-resistant, root rot, corn borer resistance, rootworm resistance, *diplodia* ear rot resistance, *phytophthora* tolerance, black cutworm resistance, fall armyworm resistance, and others).

Further, in step 308, the process 300 can optionally comprise displaying nutrient characteristic information for selection by the user. The nutrient characteristic information can comprise one or more food grade attributes, such as germ, grass seed, oil, protein, starch, carbohydrate, lipid, amino acid, vitamin, mineral, antioxidant, milling quality, baking quality, malt quality (e.g., malt extract, diastatic power and wort viscosity), or other food nutrient characteristics or content classes. For example, milling can depend on three factors: (i) size and evenness of the kernels (which can closely correlate with the weight of grain, e.g., determined by thousand-kernel weight); (ii) texture of the endosperm (which can be characterized by glassiness or pearling index and hardness, which can influence the energy required for milling as well as the amount of semolina obtained); and (iii) percentage ratio of the seed coating (e.g., generally, the larger the kernel, and if the layers are not thicker, then the lower the ratio of seed-coating to the endosperm and germ). Further, baking quality can relate to the types of wheat uses and processing conditions. For instance, strong (hard) wheat is considered of the higher quality and suitable for bread making, whereas most cakes are made using soft wheat flour. Baking quality can be based on the rheological properties of wheat flour. The rheological property of wheat flour is essential because it can determine other physical characteristics, such as dough (baking) volume and sensory attributes. The user can select one or more of these food nutrient characteristics, which can be received by the system, as illustrated in step 310.

For example, seed germination or germ is affected by various factors, such as seed vitality, genotype, seed maturation and seed dormancy. The seed temperature and moisture content need to be maintained at optimum condition to protect the germination percentage by reducing the metabolic activity of seeds. The optimum condition is not uniform for all types of seed. Based on the equilibrium moisture content characteristics of seed, this optimum condition varies. Successful seed storage can depend upon the seed moisture, seed temperature, RH, and/or initial seed quality. In general, a 1% reduction in seed moisture doubles the life of seed. Further, in general, each 5° C. (9° F.) reduction in temperature doubles the life of seed. However, there is a lower limit and an upper limit in seed moisture content and temperature for not killing the germ. Optimum storage condition in terms of seed temperature and RH can be provided as T(° F.)+RH (%)≥100. Further, the seed temperature and RH can be related with equilibrium moisture content characteristics of that seed. For example, for soybean, if the RH is less than 40%, the soybean splits and loses germination. In accordance with some embodiments, such an outcome can be avoided using one of the seed storage systems disclosed herein, which can employ the use of EMC curves for determining instructions for controlling and operating grain storage equipment.

Similarly, oil or fat in grain will break down into free fatty acids (FFA) and glycerol by lipases during storage when the temperature and moisture content are high. FFA is an indicator of grain spoilage. Lipid oxidation in grains can degrade linoleic and linolenic acids, vitamin A, vitamin C, tocoferols and carotenoids. Accordingly, for grain such as soybeans, the temperature should be kept below 40° C. to have good oil content in the grain.

With regard to protein, the solubility (see the nitrogen solubility index) and digestibility of grain protein can decrease during storage due to adverse temperature and RH conditions. For example, adverse temperature and RH affects tofu yield and soymilk quality. At higher soybean storage temperature (above 20° C.) and RH (above 55%), the pH value of soymilk decreases which decreases the solid extractability. These reductions may be higher or lower based on the soybean hybrids. At 30° C. and 40° C., a study has shown significant decreases in tofu yield, but not at 22° C. Accordingly, if there is a hotspot in a soybean bin intended for tofu, and the temperature has risen above 30° C., the quality of the tofu will be greatly affected.

Similarly, wheat protein has shown that at 10° C., there was no biochemical change occurred in wheat; however, above 25° C., there were significant decreases in total available lysine by more than 18% and protein digestibility decreased by above 5%.

With regard to starch and carbohydrates, these food grade attributes can be protected by maintaining a low moisture content of the grain (low RH) and low temperature. Low moisture content of the grain (i.e., low RH) and low temperature can reduce the respiration rate of the grain, thereby preventing decomposition of the starch or carbohydrate content and decreasing fungi and bacteria. Storing grain at proper conditions, such as at a RH of less than 65% and a temperature of less than 60° F. (about 15° C.) can provide optimum storage conditions for short duration storage, e.g., less than six months for temperate climates and less than one to two months for tropical climates. For longer duration storage (e.g., greater than six months), the grain needs to be maintained in an environment in which the RH is less than 55%. If the grain is stored more than one year and in a storage bin, the grain should be cooled, warmed up, and/or aerated to maintain proper conditions. Otherwise, the grain can spoil because of moisture migration or condensation due to temperature gradient in the grain mass.

Referring again to FIG. 3, as shown in step 312, the process 300 can generate instructions, based on the received input, for controlling an operation of the grain storage equipment. The process 300 can be repeated as new data or inputs are received into the system, automatically or manually. Therefore, some embodiments disclosed herein can condition grain by monitoring grain temperature and moisture and/or providing instructions for an aeration or drying strategy or program based on the desired food grade attributes of the grain (protein, starch, oil, germ, and others). Thus, fan controllers and algorithms based on weather data and grain temperature and moisture data can be used in some embodiments to properly condition grain in a grain bin.

Grain conditioning equipment may be controlled based on the generated instructions. For example, the grain conditioning equipment may be activated or deactivated based on the instructions. The instructions may further establish parameters for a grain conditioning operation, such as timing, duration, rates/ratios, and magnitude of operation of the grain conditioning equipment. Alternatively, an active grain conditioning operation or strategy or program may be updated or modified based on the instructions.

In an implementation of some embodiments, Applicants have found that when the starch and protein content of corn is lower, a representative EMC curve is also lower. For example, a high protein content (10.6%) and starch content (70.4%) of a corn hybrid ("P9690R hybrid") exhibits an EMC curve that allows the P9690R hybrid to store well at a storage moisture content of 15% to 15.5%. However, another corn hybrid ("P1018AMX hybrid") with a lower protein content (7.7%) and starch content (60%) exhibits a lower EMC curve. If stored at the same marketable moisture content of 15-15.5% as the P9690R hybrid, the protein and starch content of the P1018AMX hybrid will degrade. This change in starch, protein, and/or oil content and its relationship to the EMC values can be used in some embodiments disclosed herein to provide superior grain conditioning in order to target desired nutritional attributes and/or two reflect growing, conditioning, or environmental characteristics.

Referring now to FIG. 4, the process 350 begins in step 351 when a user loads the browser on the client 110 for viewing and/or controlling an operation of the grain management system. As shown in step 352, the process 350 can include receiving one or more types of data inputs, including detect environmental conditions inside or outside a grain bin, such as temperature, RH, absolute humidity, air velocity, or air pressure, and/or attributes of the grain or grain bin, such as grain mass, temperature, weight, size, or other such attributes, as discussed above with respect to process 300.

Steps 354 and 356 optionally can be performed to display grain varietal information and/or receive a selection of a varietal input from the user, as discussed above with respect to process 300.

The process 350 can optionally comprise displaying growing characteristic information for selection by the user, as shown in step 358. The growing characteristic information can comprise one or more environmental or drying characteristics to which the grain has been or will be subjected, such as harvest time or maturity, the area in which the grain is grown (including soil types, weather, climate zones, or other attributes of the environment in which the grain is grown), seed coating thickness, the type of fertilizer used, the plant population, the planting mode, the drying method, or other environmental or drying characteristics. Other growing characteristics can include growing degree units ("GDU") attained during growth. A GDU can be calculated as a daily measurement of heat accumulation that can be used to predict plant development rates, such as the date that a crop will reach maturity. The GDU for a given day can be calculated by taking an average of the maximum and minimum temperatures for the day and subtracting a base temperature from the average. The cumulative GDU for a given plant can be the summation of daily GDU over the growing season. For example, a given seed type may attain 2700 GDU during its growth time before harvest.

Moreover, other growing characteristic information can comprise organic or inorganic cultivation practices, nighttime air temperature during flowering or critical growth stages, type of tillage used (no till or minimal or intensive or conversation tillage with different crop residue cover), use of any agricultural biologicals (e.g., microbials, plant extracts, beneficial insects and other material used to increase crop health and productivity), and/or soil moisture and temperature.

The user can enter one or more of these growing characteristics, which can be received by the system, as illustrated in step 360.

For example, the harvest time can be a growing characteristic entered by the user that can be factored into the conditioning of the grain. Applicants have found that if a given grain stays in the field longer than another grain, the given grain tends to cannibalize itself or degrade, and will therefore behave differently in the bin than the other grain. Thus, the harvest time of grain can affect the maturity and behavior of the grain in the storage bin. The harvest time can be an indicator, number, or data representative of a comparison of the recommended maturity date or harvest date by the seed company and the actual harvest time of the grain. In addition or instead, the harvest time can be the moisture content of the grain at harvest. Generally, to ensure optimal harvest timing, so that the farmer can reduce or avoid field loss, the seed company provides information regarding an optimum moisture content level for grain at harvest. This information, and/or the measured moisture content level of the grain at harvest, can be used as the harvest time growing characteristic, according to some embodiments. Thus, the harvest time can include the moisture content of the grain at harvest (actual or expected), the harvest date (e.g., the month or day of the year, whether absolute or relative to a date, such as a target harvest date), and/or the harvest environmental characteristics (e.g., temperature, RH, absolute humidity, air velocity, air pressure, and/or other characteristics). For storage, the grain can be conditioned by lowering RH and temperature based on the EMC characteristics of the grains.

Further, the area in which the grain is grown can be entered as a characteristic input, representative of a growing characteristic, that can be factored into the conditioning of the grain. Although there are hundreds of types of soil, some of the soil types that can be entered or selected by the user include fine sandy loam, loan, silt loam, silty clay, silty clay loam, clay, clay loam, sandy, sandy loam, and any of the various subcategories. For example, subcategories can be given as the percentages of land area occupied by the soils of 12 orders, estimated as: Alfisols 13.9%, Andisols 1.7%, Aridisols 8.3%, Entisols 12.3%, Gelisols 8.7%, Inceptisols 9.7%, Mollisols 21.5%, Oxisols 0.02%, Spodosols 3.5%, Ultisols 9.2%, and Vertisols 2.0%.

In some embodiments, the weather or climate zones can also be used as a characteristic input. For example, a measure of the temperature during growth of the grain (e.g., an average daily temperature, temperature range, temperature highs and/or lows), precipitation or irrigation information (e.g., irrigation per acre, average rainfall), sun exposure during growth of the grain, RH during growth of the grain, or climate zone in which the grain is grown can be uses a characteristic input. Further, the seed coating thickness or strength, which can affect drying and splitting of grain, such as soybeans, can be used as a characteristic input.

Other characteristic inputs can include the type of fertilizer used. For example, some types of fertilizer include categories such as nitrogen, phosphorus, potassium, inorganic and organic forms. Characteristic inputs can also include the planting mode of the grain. For example, the user can input whether the grain was plowed in, tilled in, no till, whether corn stover was removed, or otherwise planting conditions.

Characteristic inputs related to conditioning or drying methods can include whether the grain will be dried at a high temperature (loss test weight during drying and there will be a change in EMC characteristics), whether the grain will be dried at a low temperature (which is generally good for drying and maintain seed quality), whether a spreader will be used (such as spreading the fine in the grain mass evenly in the bin or collecting grain in the center and removing as coring), the airflow rate, the amount of mycotoxins contamination from field, the amount of fines, broken kernels, splits, and/or other such parameters.

As shown in FIG. 4, after a characteristic input has been received, step 362 can be performed in which the process 350 generates instructions, based on the received input, for controlling and operation of the grain storage equipment. The process 350 can be repeated as new data or inputs are received into the system, automatically or manually. Therefore, some embodiments disclosed herein can condition grain by monitoring grain temperature and moisture and/or providing instructions for an aeration or drying strategy or program based on a characteristic (e.g., a growing, environmental, or conditioning characteristic) of the grain. Thus, fan controllers and algorithms based on weather data and grain temperature and moisture data can be used in some embodiments to properly condition grain in a grain bin.

Grain conditioning equipment may be controlled based on the generated instructions. For example, the grain conditioning equipment may be activated or deactivated based on the instructions. The instructions may further establish parameters for a grain conditioning operation, such as timing, duration, rates/ratios, and magnitude of operation of the grain conditioning equipment. Alternatively, an active grain conditioning operation or strategy or program may be updated or modified based on the instructions.

Figure 5A:
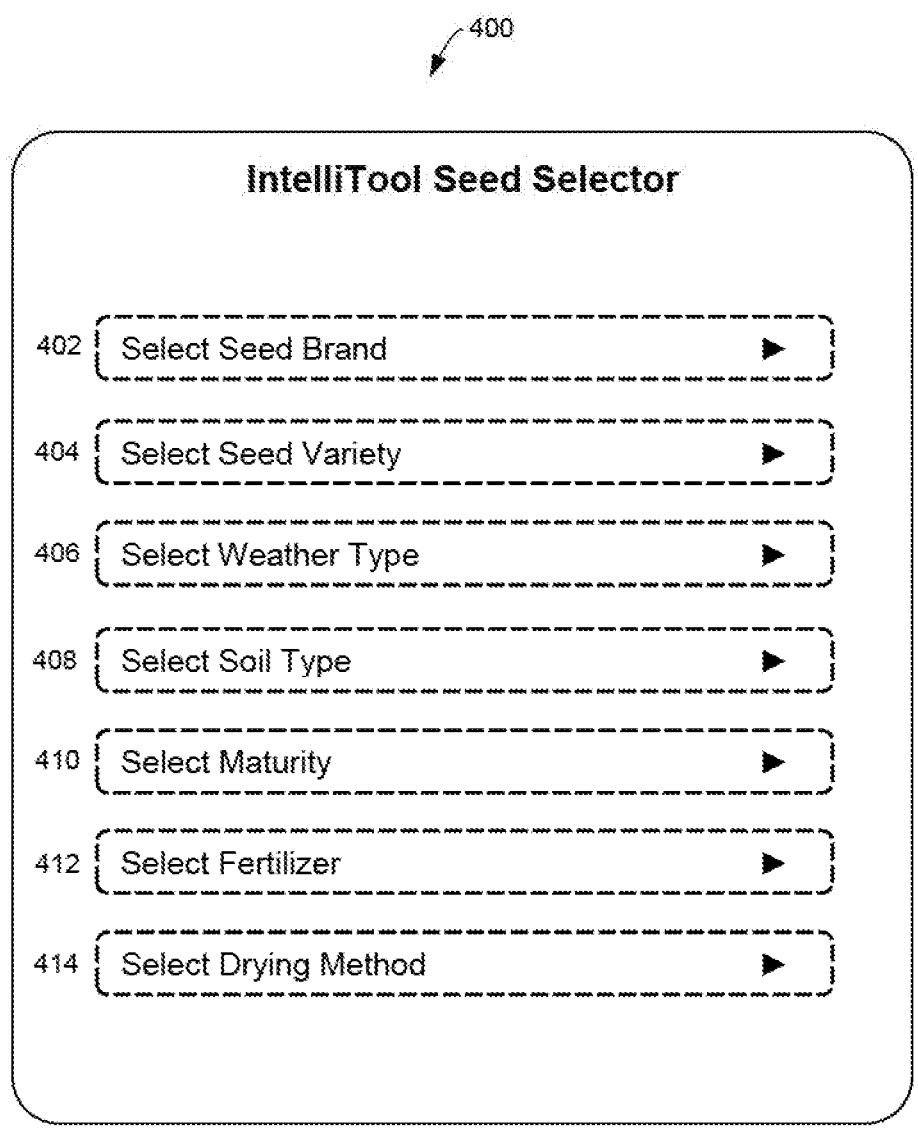
FIGS. 5A-5C are example screenshots associated with the example processes shown in FIGS. 3 and 4, according to some embodiments.
Figure 5B:
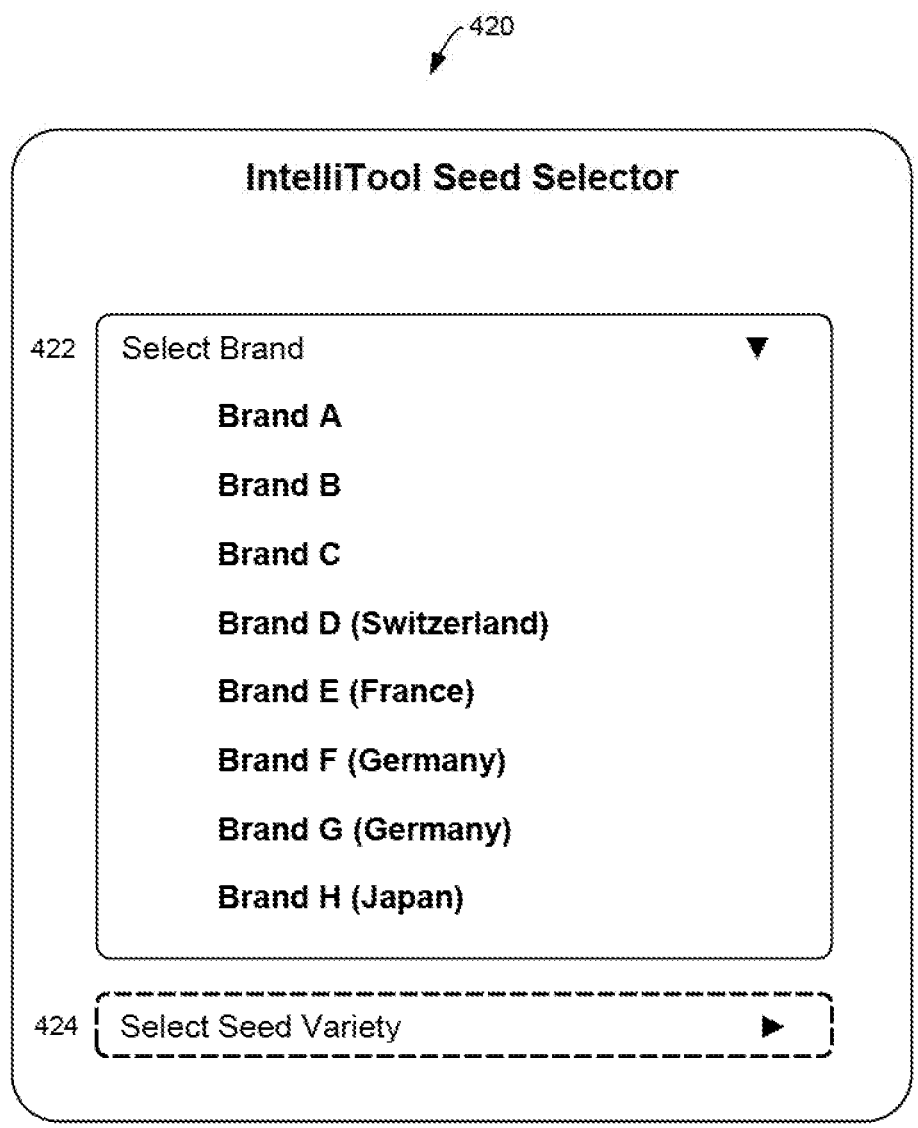
Figure 5C:
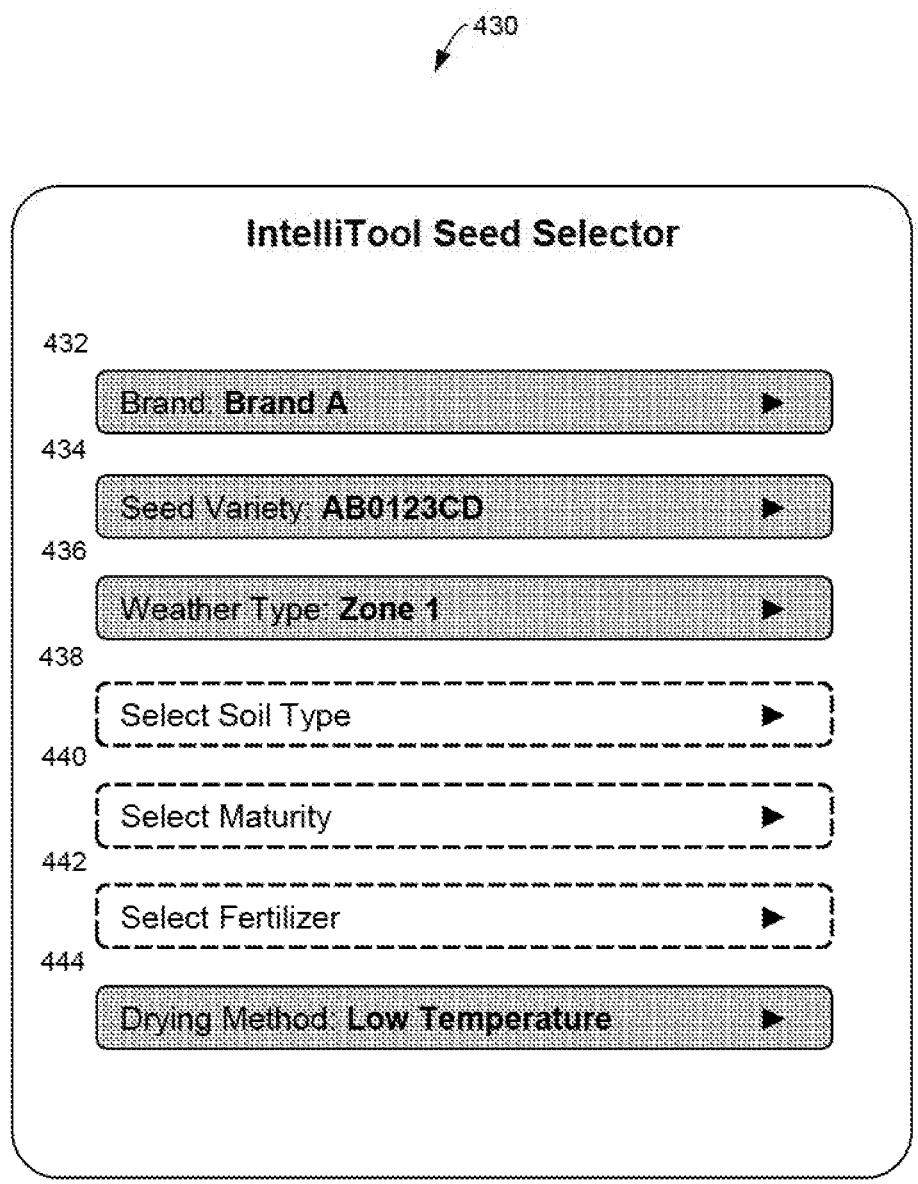

FIGS. 5A-5C illustrate example screenshots 400, 420, 430 of how a display for the process may appear to a user on the client 110. FIG. 5A illustrates a screenshot 400 of a display of user-selectable categories, such as seed brand (e.g., 402), seed variety (e.g., 404), weather type (e.g., 406), soil type (e.g., 408), maturity (e.g., 410), fertilizer (e.g., 412), or drying method (e.g., 414). FIG. 5B illustrates a screenshot 420 of a display in which a drop-down selection menu of different seed companies or brands (e.g., 422) is expanded so that a given company or brand can be selected by the user (e.g., 424). Further, FIG. 5C illustrates a screenshot 430 of a display in which various parameters have been designated by the user (e.g., brand 432, seed variety 434, weather type 436, soil type 438, maturity 440, fertilizer 442, and drying method 444), which can then be used as a basis for generating instructions for operation of the grain conditioning equipment.

Figure 6:
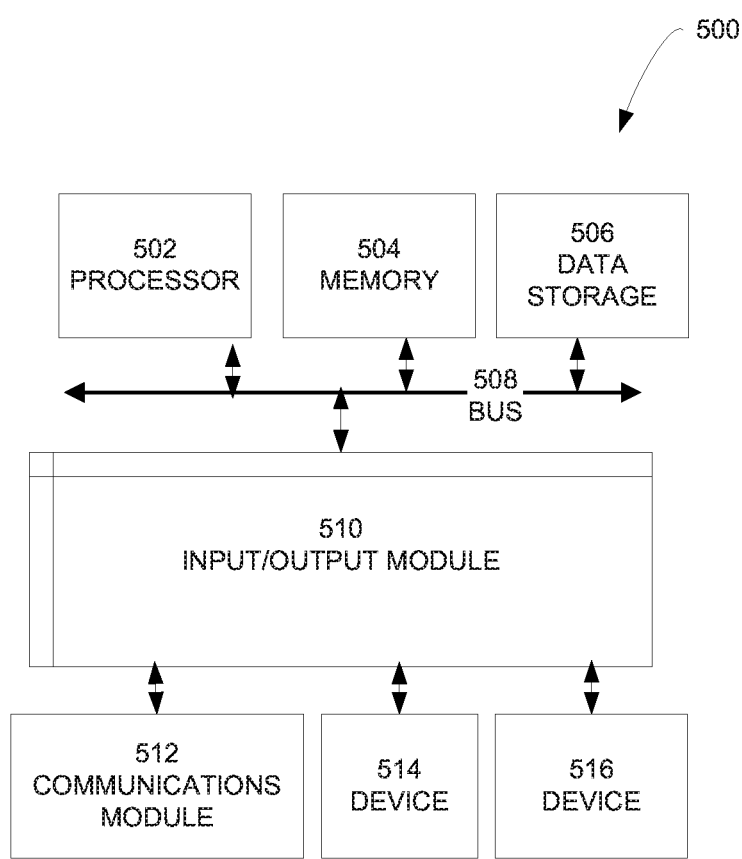
FIG. 6 is a block diagram illustrating an example computer system with which the clients and server of FIG. 2 can be implemented.

FIG. 6 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

Illustration of Subject Technology as Clauses

The present disclosure provides for a conditioning system that can determine a grain conditioning operation for a grain mass based on data associated with the grain mass. Optionally, the data associated with the grain mass is received from a sensor. The sensor may be positioned within or near the grain mass. Optionally, the system can take into account a food nutrient characteristic for the grain mass. The food nutrient characteristic may be one or more of a germ, grass seed, oil, protein, starch, carbohydrate, lipid, amino acid, vitamin, mineral, antioxidant, milling, baking quality, and malt quality.

Optionally, the system can take into account humidity data of air within the grain mass. Optionally, the system can take into account a grain variety data of the grain mass. Optionally, the system may control a grain conditioning equipment based on the grain conditioning operation. The grain conditioning equipment may comprise drying equipment and the grain conditioning operation may comprise a drying operation.

Optionally, the system comprises an interface. The interface may display the data associated with the grain mass and/or the growing characteristic. The interface may facilitate inputting the data associated with the grain mass and/or the food nutrient characteristic. The interface may comprise grain varieties, at least one of which being selectable through the interface to input the data associated with the grain mass. The interface may comprise food nutrient characteristics, at least one of which being selectable through the interface to input the food nutrient characteristic of the grain mass. The interface may comprise a touch input. Optionally, the system comprises a handheld device for presenting the interface.

Optionally, the system determines a grain conditioning operation suitable for storing the grain mass based on the grain variety of the grain mass and a growing characteristic of the grain mass.

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A system comprising: one or more processors; and a non-transitory computer-readable medium comprising instructions stored therein, which when executed by the one or more processors, cause the one or more processors to perform operations comprising: receiving data associated with a grain mass; receiving at least one food nutrient characteristic associated with the grain mass; and determining a grain conditioning operation for the grain mass based at least on the data associated with the grain mass and the at least one food nutrient characteristic.

Clause 2. The system of Clause 1, wherein the data associated with the grain mass comprises humidity data of air within the grain mass and grain variety data of the grain mass.

Clause 3. The system of Clause 1 or 2, wherein the at least one food nutrient characteristic comprises at least one of a germ, grass seed, oil, protein, starch, carbohydrate, lipid, amino acid, vitamin, mineral, antioxidant, milling, baking quality, and malt quality.

Clause 4. The system of Clause 1, 2, or 3, wherein the operations further comprise controlling a grain conditioning equipment based on the grain conditioning operation.

Clause 5. The system of Clause 4, wherein the grain conditioning operation comprises a drying operation and the grain conditioning equipment comprises drying equipment.

Clause 6. The system of any of Clauses 1-5, wherein the data associated with the grain mass is received from a sensor configured to be positioned within the grain mass to detect the data associated with the grain mass.

Clause 7. The system of any of Clauses 1-6, further comprising an interface for displaying the data associated with the grain mass and the at least one food nutrient characteristic.

Clause 8. The system of Clause 7, wherein the interface facilitates inputting of the data associated with the grain mass and the at least one food nutrient characteristic.

Clause 9. The system of Clause 7 or 8, wherein the interface comprises a plurality of grain varieties, at least one of the plurality of grain varieties selected through the interface as the data associated with the grain mass, wherein the interface comprises a plurality of food nutrient characteristics, at least one of the plurality of food nutrient characteristics selected through the interface as the at least one food nutrient characteristic.

Clause 10. The system of Clause 7, 8, or 9, wherein the interface comprises a touch input.

Clause 11. The system of any of Clauses 7-10, further comprising a handheld device for presenting the interface.

Clause 12. A non-transitory computer-readable medium comprising instructions stored therein, which when executed by one or more processors, cause the one or more processors to perform operations comprising: receiving humidity data of air within a grain mass; receiving at least one food nutrient characteristic for the grain mass; and determining a grain conditioning operation for the grain mass based at least on the humidity data and the at least one food nutrient characteristic.

Clause 13. The non-transitory computer-readable medium of Clause 12, wherein the at least one food nutrient characteristic comprises at least one of a germ, grass seed, oil, protein, starch, carbohydrate, lipid, amino acid, vitamin, mineral, antioxidant, milling, baking quality, and malt quality.

Clause 14. The non-transitory computer-readable medium of Clause 12 or 13, wherein the operations further comprise controlling a grain conditioning equipment based on the grain conditioning operation.

Clause 15. The non-transitory computer-readable medium of Clause 12, 13, or 14, wherein the humidity data is received from a sensor positioned within the grain mass.

Clause 16. The non-transitory computer-readable medium of any of Clauses 12-15, further comprising receiving grain variety data of the grain mass, wherein the grain conditioning operation is further determined based on the grain variety data.

Clause 17. The non-transitory computer-readable medium of Clause 16, wherein the at least one food nutrient characteristic and the grain variety data are received from an interface comprising a plurality of food nutrient characteristics and a plurality of grain varieties.

Clause 18. A method comprising: receiving humidity data of air within a grain mass; receiving grain variety data of the grain mass; receiving at least one food nutrient characteristic for the grain mass; determining a grain conditioning operation for the grain mass based at least on the humidity data and the at least one food nutrient characteristic; and controlling a grain conditioning equipment based on the grain conditioning operation.

Clause 19. The method of Clause 18, wherein the grain conditioning operation comprises a drying operation and the grain conditioning equipment comprises drying equipment.

Clause 20. The method of Clause 18 or 19, wherein the humidity data is received from a sensor, and the at least one food nutrient characteristic and the grain variety data are received from an interface comprising a plurality of food nutrient characteristics and a plurality of grain varieties.

Other Remarks

In one aspect, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, means, a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and execute the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (e.g., receiving, determining, providing, generating, converting, displaying, notifying, accepting, selecting, controlling, transmitting, reporting, sending, or any other action or function) are described as being performed by an item (e.g., one or more of blocks, modules, elements, components or processors), it is understood that such actions or functions may be performed, for example, by the item directly. In another example, when an item is described as performing an action, the item may be understood to perform the action indirectly, for example, by facilitating such an action (e.g., assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (e.g., performing a beginning part of the action, performing an end part of the action, or performing a middle portion of the action).

A reference to an element in the singular is not intended to mean one and only one unless specifically so stated, but rather one or more. For example, a clock signal may refer to one or more clock signals, a control signal may refer to one or more control signals, an input signal may refer to one or more input signals, an output signal may refer to one or more output signals, and a signal may refer to differential voltage signals.

Unless specifically stated otherwise, the term some refers to one or more. Pronouns in the masculine (e.g., his) include the feminine and neuter gender (e.g., her and its) and vice versa. Headings and subheadings, if any, are used for convenience only and do not limit the invention.

The word exemplary is used herein to mean serving as an example or illustration. Any aspect or design described herein as exemplary is not necessarily to be construed as preferred or advantageous over other aspects or designs. In one aspect, various alternative configurations and operations described herein may be considered to be at least equivalent.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. In one aspect, some of the dimensions are for clarity of presentation and are not to scale.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

A phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one or more aspects, the terms "substantially" and "approximately" may provide an industry-accepted tolerance for their corresponding terms and/or relativity between items. Such an industry-accepted tolerance may range from less than one percent to 20 percent.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for. Furthermore, to the extent that the term include, have, or the like is used, such term is intended to be inclusive in a manner similar to the term comprise as comprise is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

What is claimed is:

1. A system comprising:
   one or more processors; and
   a non-transitory computer-readable medium comprising instructions stored therein, which when executed by the one or more processors, cause the one or more processors to perform operations comprising:
      receiving data associated with a grain mass;
      receiving a selection of at least one target nutrient characteristic not currently achieved in the grain mass but to be achieved in the grain mass as a result of a grain conditioning operation performed on the grain mass;
      determining, based on the selected at least one target nutrient characteristic and the data associated with the grain mass, a respective grain conditioning operation associated with controlling grain conditioning equipment to achieve the target nutrient characteristic in the grain mass; and
      sending a signal representative of the respective grain conditioning operation to control the grain conditioning equipment based on the signal and for achieving the target nutrient characteristic in the grain mass.

2. The system of claim 1, wherein the data associated with the grain mass comprises humidity data of air within the grain mass and grain variety data of the grain mass.

3. The system of claim 1, wherein the at least one target nutrient characteristic comprises at least one of a germ, grass seed, oil, protein, starch, carbohydrate, lipid, amino acid, vitamin, mineral, antioxidant, milling, baking quality, and malt quality.

4. The system of claim 1, wherein the operations further comprise controlling the grain conditioning equipment based on the respective grain conditioning operation.

5. The system of claim 4, wherein the respective grain conditioning operation comprises a drying operation and the grain conditioning equipment comprises drying equipment.

6. The system of claim 1, wherein the data associated with the grain mass is received from a sensor configured to be positioned within the grain mass to detect the data associated with the grain mass.

7. The system of claim 1, further comprising an interface for displaying the data associated with the grain mass and the at least one target nutrient characteristic, wherein the interface facilitates inputting of the data associated with the grain mass and the at least one target nutrient characteristic.

8. The system of claim 7, wherein the interface comprises a plurality of grain varieties, at least one of the plurality of grain varieties selected through the interface as the data associated with the grain mass, wherein the interface comprises a plurality of food nutrient characteristics, at least one of the plurality of food nutrient characteristics selected through the interface as the at least one target nutrient characteristic.

9. The system of claim 7, wherein the interface comprises a touch input.

10. The system of claim 9, further comprising a handheld device for presenting the interface.

11. The system of claim 1, further comprising:
   receiving the selection of the at least one target nutrient characteristic based on historical data associated with the grain conditioning equipment, wherein the target nutrient characteristic is associated with an operation of the grain conditioning equipment during a prior conditioning of a grain having a grain type associated with the grain mass.

12. A non-transitory computer-readable medium comprising instructions stored therein, which when executed by one or more processors, cause the one or more processors to perform operations comprising:
   receiving humidity data of air within a grain mass;
   receiving a selection of at least one target nutrient characteristic not currently achieved in the grain mass but to be achieved in the grain mass as a result of a grain conditioning operation performed on the grain mass;
   determining, based on the selected at least one target nutrient characteristic and the data associated with the grain mass, a respective grain conditioning operation associated with controlling grain conditioning equipment to achieve the target nutrient characteristic in the grain mass; and
   sending a signal representative of the respective grain conditioning operation to control the grain conditioning equipment based on the signal and for achieving the target nutrient characteristic in the grain mass.

13. The non-transitory computer-readable medium of claim 12, wherein the at least one target nutrient characteristic comprises at least one of a germ, grass seed, oil, protein, starch, carbohydrate, lipid, amino acid, vitamin, mineral, antioxidant, milling, baking quality, and malt quality.

14. The non-transitory computer-readable medium of claim 12, wherein the operations further comprise controlling the grain conditioning equipment based on the respective grain conditioning operation.

15. The non-transitory computer-readable medium of claim 12, further comprising receiving grain variety data of the grain mass, wherein the respective grain conditioning operation is further determined based on the grain variety data.

16. The non-transitory computer-readable medium of claim 15, wherein the at least one target nutrient characteristic and the grain variety data are received from an interface comprising a plurality of food nutrient characteristics and a plurality of grain varieties.

17. The non-transitory computer-readable medium of claim 12, the operations further comprising:
   receiving the selection of the at least one target nutrient characteristic based on historical data associated with the grain conditioning equipment, wherein the target nutrient characteristic is associated with an operation of the grain conditioning equipment during a prior conditioning of a grain having a grain type associated with the grain mass.

* * * * *